United States Patent [19]
McMurtry

[11] Patent Number: 5,257,460
[45] Date of Patent: Nov. 2, 1993

[54] MACHINE TOOL MEASUREMENT METHODS

[75] Inventor: David R. McMurtry, Wotton-Under-Edge, United Kingdom

[73] Assignee: Renishaw Metrology Limited, Gloucestershire, England

[21] Appl. No.: 895,021

[22] Filed: Jun. 8, 1992

[30] Foreign Application Priority Data

| Jun. 18, 1991 | [GB] | United Kingdom | 9113115 |
| Sep. 19, 1991 | [GB] | United Kingdom | 9120022 |
| May 1, 1992 | [GB] | United Kingdom | 9209550 |

[51] Int. Cl.⁵ .................... G01B 5/20; G05B 19/18; B23Q 1/16
[52] U.S. Cl. ........................ 33/502; 33/545; 33/549; 33/548
[58] Field of Search ............. 33/502, 503, 545, 546, 33/547, 548, 549, 551, 567, 562, 573

[56] References Cited

U.S. PATENT DOCUMENTS

| 3,795,054 | 3/1974 | Kinney | 33/502 X |
| 4,153,998 | 5/1979 | McMurtry | |
| 4,665,625 | 5/1987 | Ireland et al. | |
| 4,879,817 | 11/1989 | McMurtry | 33/502 |
| 4,884,348 | 12/1989 | Zeller et al. | 33/502 |
| 4,991,304 | 2/1991 | McMurtry | |

FOREIGN PATENT DOCUMENTS

| 0002782 | 7/1979 | European Pat. Off. |
| 3024560A1 | 1/1982 | Fed. Rep. of Germany |
| 3013378 | 12/1984 | Fed. Rep. of Germany |
| 3620118 | 12/1987 | Fed. Rep. of Germany |
| WO 91/04127 | 4/1991 | PCT Int'l Appl. |
| 1263912 | 2/1979 | United Kingdom |

OTHER PUBLICATIONS

"Periodische Uberwachung von Koordinatenmessgeraten mittels kalibrieter Prufkorper", H. Schussler, Technisches Messen, vol. 57, No. 3, Mar. 1990, Munchen, pp. 103–113.

Primary Examiner—William A. Cuchlinski, Jr.
Assistant Examiner—C. W. Fulton
Attorney, Agent, or Firm—Oliff & Berridge

[57] ABSTRACT

A core 4 is mounted on a machine tool for indexable rotation about an axis 2A, so as to bring respective cassettes 10 into position where they can be operated on by tools held in the machine tool spindle 6. The cassettes 10 may hold workpieces 14,14A for machining. After machining, the workpiece 14A is measured by a probe 20 held in the machine tool spindle 6. A pre-calibrated artifact 26 held on another cassette 10 is then indexed into the same position as previously occupied by the workpiece 14A, and comparative measurements are made of the artifact. The accuracy of these comparative measurements is increased because the artifact 26 resides on the machine tool in the same thermal environment as the workpiece during the machining, and because the measurements are made in the same position within the working volume of the machine tool, so that the same regions of the machine tool's measurement scales are utilized.

17 Claims, 6 Drawing Sheets

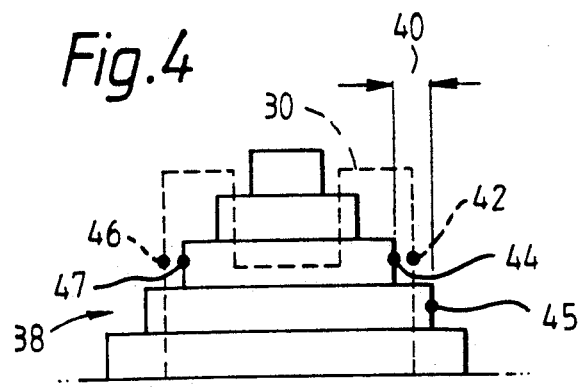
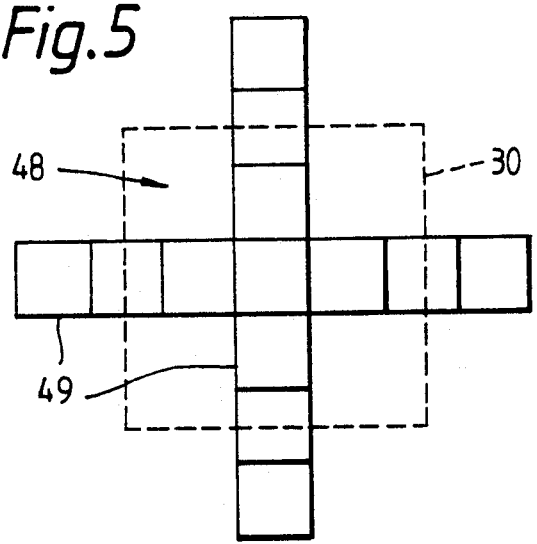
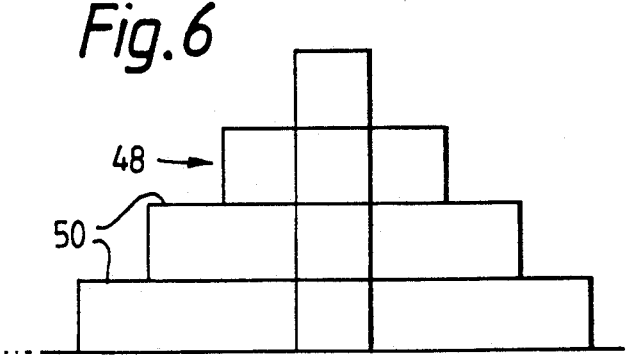

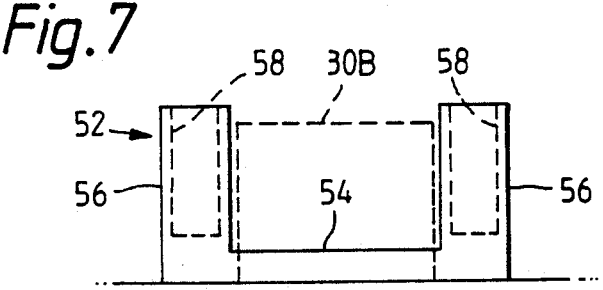
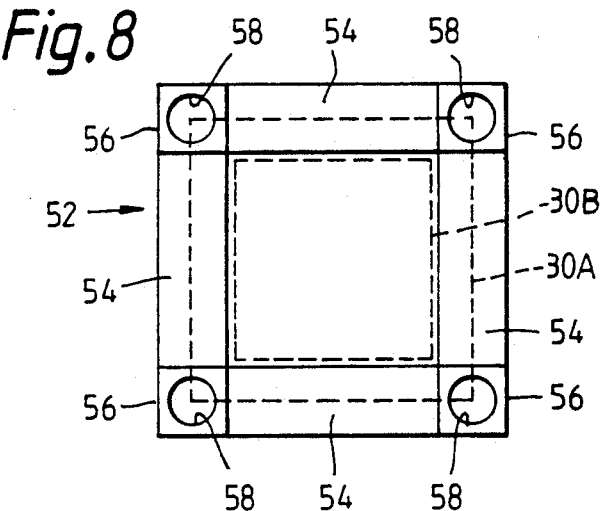
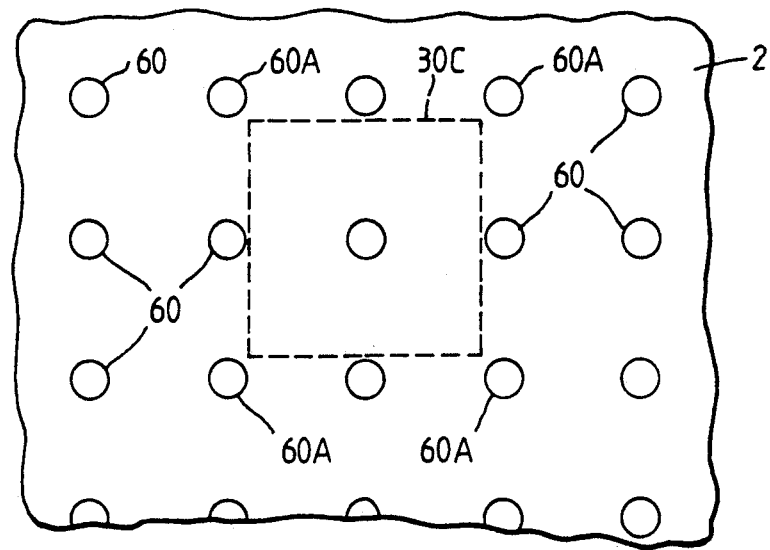

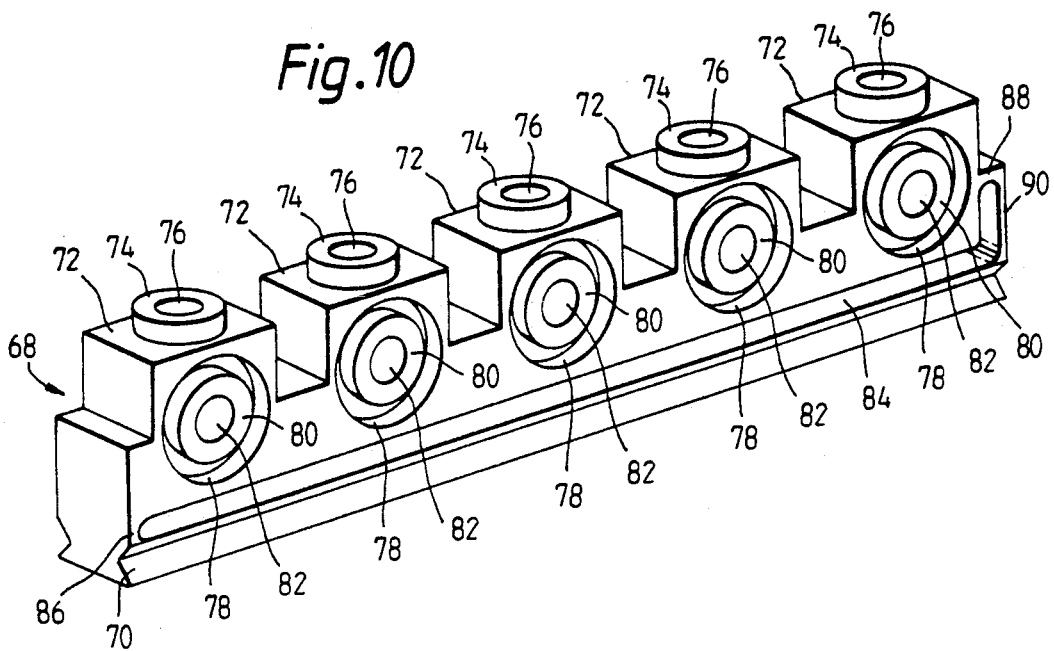
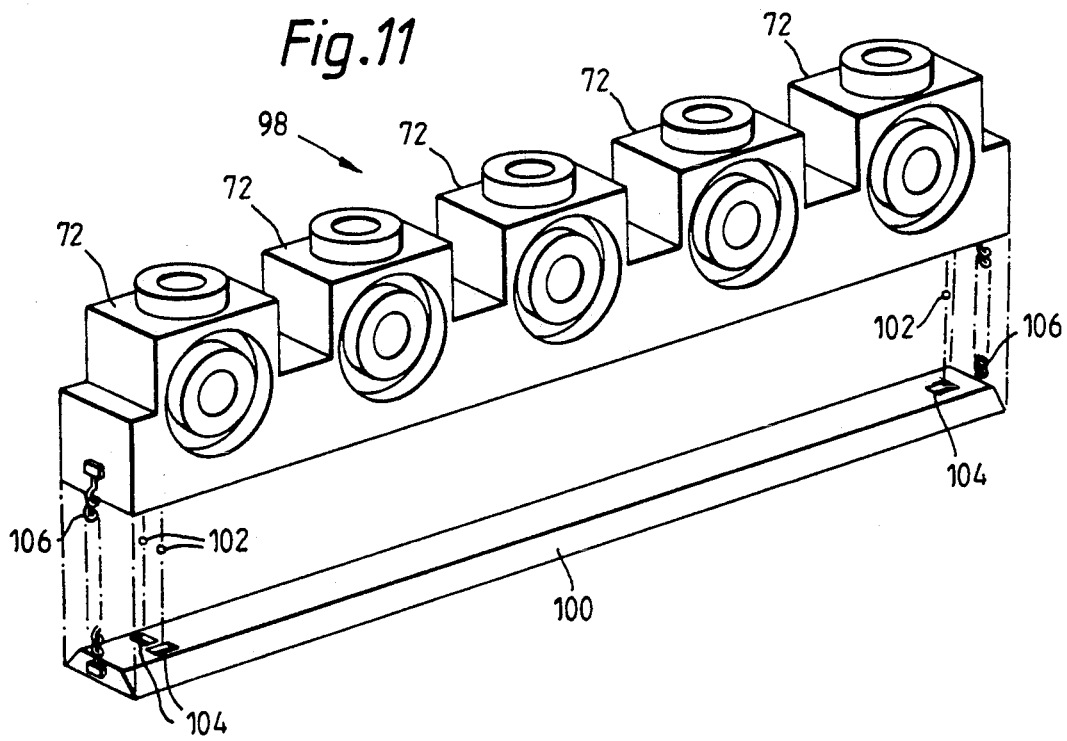

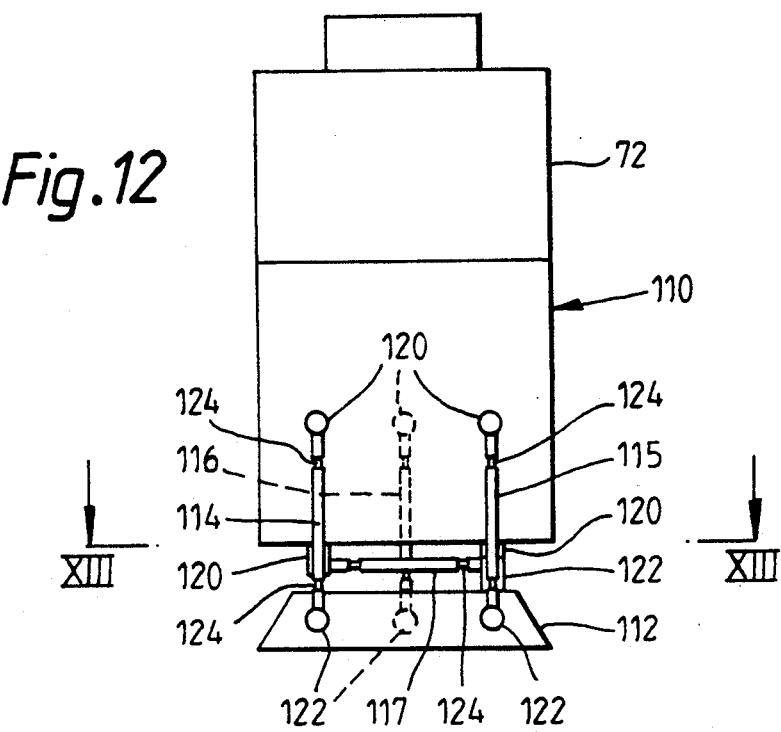
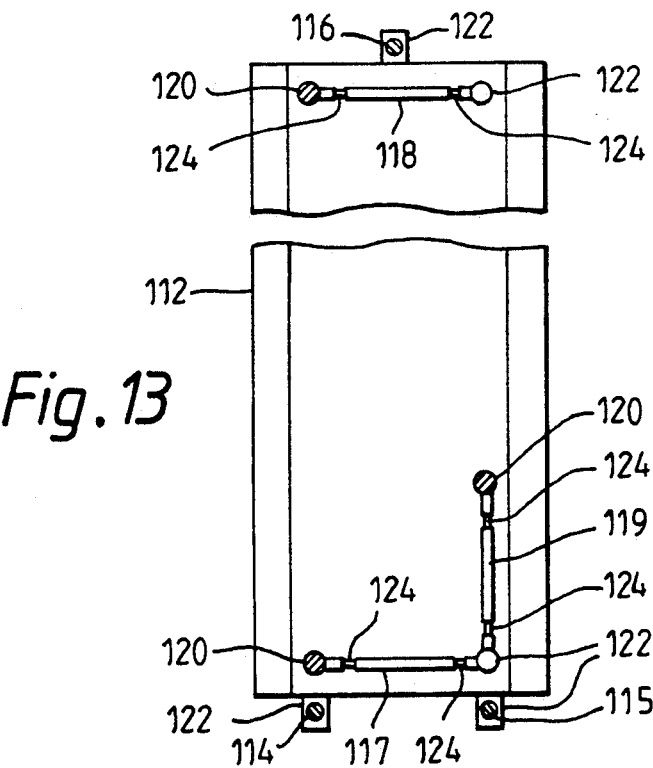

MACHINE TOOL MEASUREMENT METHODS

BACKGROUND OF THE INVENTION

This invention relates to performing measurements on machine tools. It also relates to artifacts for use in such measurements.

Numerically controlled machine tools normally include position transducers such as scales and readheads. These indicate an X,Y,Z coordinate position for the machine's cutting tool at any given time. When manufacturing workpieces on a machine tool, it is a well known inspection technique to measure the workpiece on the machine tool itself, using a probe in the place of the usual cutting tool. The probe may for example be a touch trigger probe such as described in U.S. Pat. No. 4,153,998. Such inspection techniques make use of the machine's scales or other coordinate position transducers. Consequently, while useful for detecting if a workpiece is out of tolerance as the result of, say, wear of the cutting tool, this inspection technique is unable to detect inaccuracies of the workpiece caused by inaccuracies of the machine's position transducers.

Thermal effects are one cause of such inaccuracy in the machine's transducers. There are a number of random heat inputs during normal operation of the machine tool, for example from the normal operation of the machine's motor drives and lead screws, from machining operations, etc. Thus, thermal growth of various structural components of the machine tool is inevitable, both in the form of a general drift over a period of time and in the form of changes during the course of a given machining cycle for a given workpiece. The latter changes are also affected by the necessity to apply a deluge of coolant at various times during the machining cycle. Thermal expansion and contraction of the workpiece itself can also have a significant effect.

It is known to provide a pre-calibrated artifact on a machine tool, or on a coordinate measuring machine (which is a machine dedicated to inspection of workpieces rather than to their manufacture). Such an artifact may be a replica of the nominal shape and dimensions of the particular workpiece concerned, accurately manufactured and calibrated to a traceable standard. Alternatively, the artifact may be a universal artifact, having standard test features with dimensions which are accurately known to a traceable standard (e.g. the diameter of a bore or the length between opposing sides of the artifact). Such an artifact is placed upon the machine from time to time, and the machine performs test measurements on it. Comparing the test measurement results with the known, traceable dimensions indicates any inaccuracies of the measuring capabilities of the machine caused by thermal drift over a period of time, and future measurements made by the machine can be scaled accordingly in order to compensate for the inaccuracies.

However, such known techniques do not adequately compensate for all thermally induced errors which can occur on a machine tool. The present invention seeks to provide better techniques.

SUMMARY OF THE INVENTION

One aspect of the present invention provides a method of measuring on a machine tool, the machine tool comprising two parts which are movable relative to each other, the method comprising:

providing an artifact having a known dimension on a first one of said parts, providing a probe for sensing surfaces of said artifact on the other of said parts, measuring said known dimension of said artifact using the probe, to produce a measurement value, and comparing said measurement value either with said known dimension or with a measured dimension of a workpiece, characterised in that said artifact is located on the machine tool when not being measured, in such a manner as to experience temperature changes similar to those experienced by a workpiece on the machine tool.

This enables measurement errors caused by temperature differentials between a workpiece and the artifact to be reduced or eliminated.

A second aspect of the invention provides a method of measuring a workpiece on a machine tool, the machine tool comprising two parts which are movable relative to each other, and means for measuring the displacement between the two parts, the method comprising:

locating the workpiece at a given position on a first one of said parts of the machine tool, measuring the workpiece at said position, using the measuring means of the machine tool and a probe mounted on the other one of said parts, to produce a workpiece measurement value, locating an artifact on said first part in substantially the same position as said position of the workpiece, the artifact having a known dimension, measuring the known dimension of the artifact at said position, using the measuring means of the machine tool and a probe mounted on the other one of said parts, to produce an artifact measurement value, and comparing the workpiece measurement value with the artifact measurement value, or compensating the workpiece measurement value with a value derived from the artifact measurement value.

This has the advantage that only the same small part of the measuring range of the measuring means is used for measuring both the workpiece and the artifact, which reduces the inaccuracies caused by thermal changes of the structural components of the machine tool. Although the measuring means might be inaccurate over the distance between some arbitrary origin and the position of the workpiece and artifact, because of the thermal effects, nevertheless it will still be capable of repeatable measurements within a small region close to that position.

It should be noted that in the previously known techniques using artifacts, discussed earlier, the artifact is removed from the machine once the test measurement has been undertaken. Thus, it is not in the same thermal environment as the workpiece which is being manufactured, as in the first aspect of the present invention. Neither can one be sure, in these prior techniques, that the measurements on the artifact are being made at substantially the same position within the measuring range of the machine's measuring means as the measurements on the workpiece. Therefore, if different regions of the scales are subject to different errors, such errors cannot be compensated as thoroughly as in the second aspect of the present invention.

A third aspect of the invention provides an artifact for measurement on a machine tool, comprising a measurement portion having one or more features to be measured; a mounting portion adapted to be mounted in the machine tool; and isolation means between the measurement portion and the mounting portion for at least partially isolating the measurement portion from distortion of the mounting portion.

A fourth aspect of the invention provides an artifact for measurement on a machine tool, comprising a mounting portion adapted to be mounted in a machine tool; and a plurality of artifact units provided on the mounting portion in spaced relationship to each other, each artifact unit comprising a measurement portion having one or more features to be measured.

In any of the above aspects of the invention, the artifact may be identical or similar to the nominal size and shape of the workpiece to be machined; or it may be a universal artifact having standard features of known dimensions.

Further aspects of the invention will be apparent from the following description of preferred embodiments. It should be understood that various aspects of the preferred embodiments are novel in themselves and may be used independently of the aspects of the invention discussed above.

BRIEF DESCRIPTION OF THE DRAWINGS

The preferred embodiments will be described with reference to the accompanying drawings, wherein:

FIG. 4 is a side view of a second artifact;
FIGS. 5 and 6 are plan and side views of a third artifact;
FIGS. 7 and 8 are side and plan views of a fourth artifact;
FIG. 9 is a plan view of a modified machine tool bed;
FIG. 10 is an isometric view of a fifth artifact;
FIG. 11 is an isometric view of a sixth artifact;
FIG. 12 is an end view of a seventh artifact;
and
FIG. 13 is a section on the line XIII—XIII in FIG. 12.

DESCRIPTION OF PREFERRED EMBODIMENTS

Figure 1:
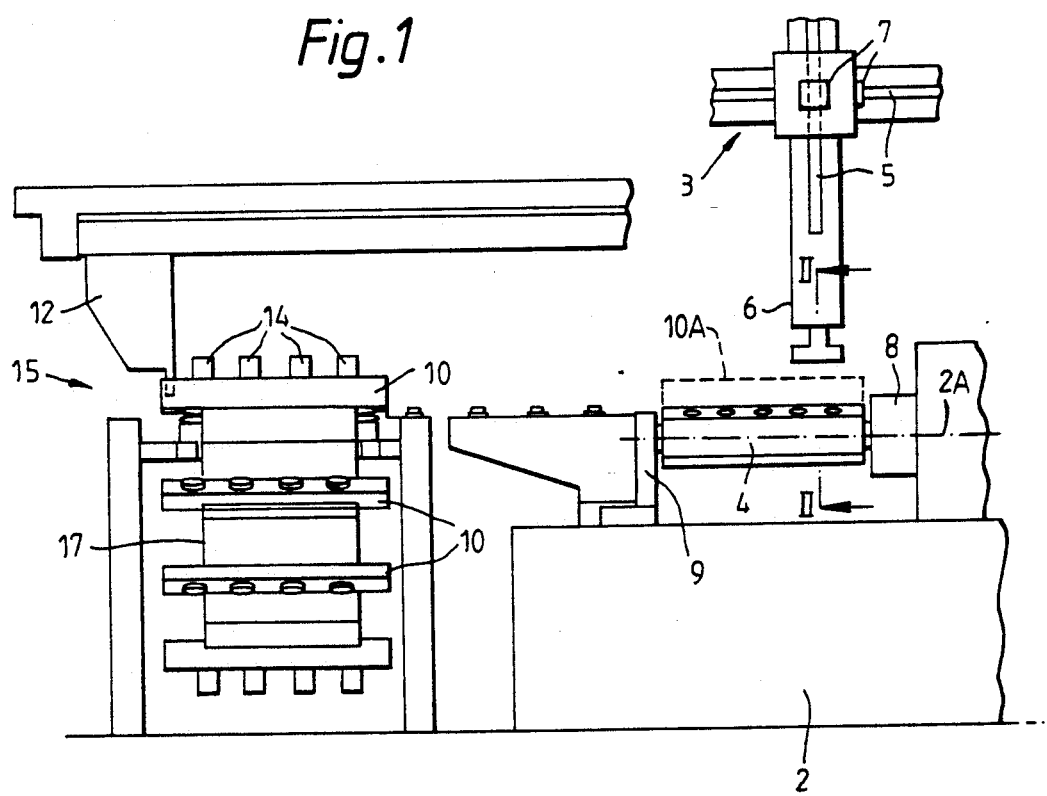
FIG. 1 is a partial side view of a machine tool.

FIG. 1 shows the pertinent parts of a machine tool, having a bed 2 and a spindle 6 which is movable in three dimensions X,Y,Z by structural components of the machine tool, of which parts are shown schematically at 3. The instantaneous X,Y,Z coordinate position is read by position transducers in the form of scales 5 and readheads 7 (one of which is not shown). The spindle 6 is designed for normally holding cutting tools, e.g. milling tools, and is rotatable about a vertical axis. A core 4 is mounted between a chuck 8 and a tailstock 9 on the bed 2 of the machine tool. The chuck 8 is rotatable by a drive motor (not shown), in order to index the core 4 into different angular orientations about an axis 2A. Adjacent the machine tool is provided a carousel 15 comprising a conveyor belt 17 loaded with cassettes 10 for holding workpieces 14, cutting tools, or artifacts described later. A transfer mechanism 12 transfers the cassettes 10 individually from the carousel 15 to a position shown by broken lines 10A on the core 4, so that they can be operated upon by the tools held in the spindle 6. For further details of the system so far described, reference should be made to our co-pending U.K. Patent Application No. 9113115.1 (from which the present application claims priority).

Figure 2:
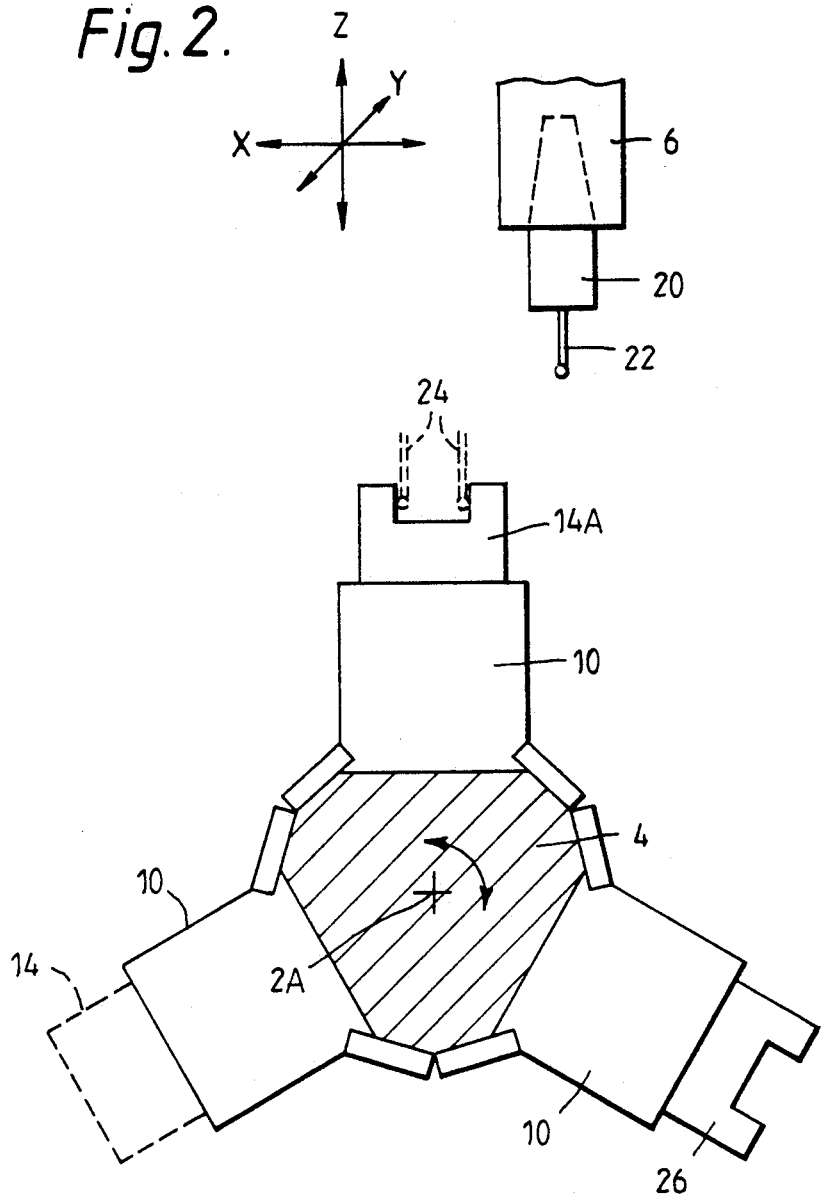
FIG. 2 is a section on the line II—II in FIG. 1.

FIG. 2 shows a cross-section of the core 4, carrying three cassettes 10 at angular orientations of 120° from each other. The core 4 can be indexed about the axis 2A so that a workpiece 14 held in any of these cassettes 10 can be brought to the uppermost, vertical position where it can be operated upon by tools held in the spindle 6. In the example shown in FIG. 2, the uppermost workpiece 14A has been machined by milling tools held in the spindle 6, and is now about to be inspected by a probe 20 held in the spindle 6, for example a touch trigger probe. The stylus 22 of the probe 20 is touched against all features of the workpiece 14A which are to be inspected, and at each touch position a reading is taken from the scales 5 and readheads 7, indicating the instantaneous X,Y,Z coordinates of the spindle 6 relative to the bed 2. For example, as suggested by broken lines 24, the stylus 22 may touch opposing sides of a bore in the workpiece 14A, in order to determine the diameter of the bore by subtraction of the resulting coordinates from each other.

In accordance with the present invention, immediately after the inspection of the newly-machined workpiece 14A by the probe 20, the core 4 is rotatably indexed about its axis 2A, in order to bring an artifact 26 into the position previously occupied by the workpiece 14A. This artifact 26 has been previously manufactured and calibrated to a traceable standard (e.g. to the standards of an appropriate national standards authority) so that its dimensions are accurately known. With the artifact 26 in the place of the workpiece 14A, the same measurement cycle using the probe 20 is repeated. In this example, the artifact 26 is an accurate replica of the nominal size and shape of the workpiece 14A. Having taken all the same measurements on the artifact 26 as on the workpiece 14A, the results can now be directly compared with each other, e.g. in the computer numerical control of the machine tool, in order to determine any differences and to determine whether the workpiece 14A is in or out of tolerance. If it is out of tolerance, it may be rejected, or the control may take corrective measures such as further machining. Alternatively, where a series of nominally identical workpieces is being machined the control may detect inaccuracies before they are so great as to require rejection of a workpiece, and use this information to correct the machining of subsequent workpieces.

Two important facts should be noted. Firstly, the artifact 26 remains attached to its cassette 10 on the core 4 throughout the machining cycle when the workpiece 14A is machined. So far as possible, therefore, it is subject to the same thermal environment as the workpiece 14A. Indeed, if (as would be normal) the workpiece 14A is subjected to a deluge of coolant during the machining cycle, and if such coolant deluge does not simultaneously affect the artifact 26, then a special coolant deluge step may be included in the cycle for measuring the artifact 26 after it has been indexed to the upright position. Because the artifact experiences the same thermal environment as the workpiece, it will be at the same temperature, as nearly as possible, and subject to the same thermal expansions. The workpiece 14A can therefore be more accurately compared to the artifact 26 than would otherwise be the case.

Secondly, all measurements on the artifact 26 are taken at, as nearly as possible, the same points in space as the corresponding measurements on the workpiece 14A. In consequence, each point will be measured at nearly the same position within the measuring range of the scales 5, subject only to differences between the dimensions of the workpiece 14A as manufactured compared with the accurate dimensions of the artifact 26. The relevance of this is that, although it is very likely that the accuracy of the scales will be affected by thermal distortions of components of the machine tool, nevertheless their repeatability when comparing a point on the workpiece 14A and a corresponding point on the artifact 26 can be relied upon to be much better. In other words, although the reading obtained from the scales may be inaccurate in absolute terms, nevertheless the repeatability ensures that a much more accurate comparison can be made of the workpiece 14A relative to the artifact 26. One needs only to worry about the inaccuracy of the scale over the very short distance between the position of the point when measured on the workpiece, and when measured on the artifact; indeed if the workpiece accurately corresponds to the artifact then this distance will be zero and there will be no resulting inaccuracy in the comparison.

Normally, multiple workpieces 14 will be provided on the cassette 10, as shown in FIG. 1, so that each can be machined in turn. It is then preferred to provide a corresponding number of artifacts 26 on another of the cassettes 10, so that when indexed into the measurement position, one of the artifacts occupies the same position in space as was occupied by each of the workpieces, as nearly as possible. Measurements on a given workpiece are then compared with measurements on the corresponding artifact in the same position in space.

The invention is not limited to the use of the core 4 and cassettes 10 of the above-mentioned co-pending application. Any other method of mounting the artifact 26 in the thermal environment of the machine tool and then shifting it into the position normally occupied by the workpiece may be used. For example, any other indexable multiple workpiece holder may be used. On a machine tool with a horizontal spindle, the core 4 can be replaced by a tombstone which is mounted for indexable rotation about a vertical axis. This tombstone is provided with (say) four faces, each of which can hold one or more workpieces or artifacts, and each of which can be indexed into a position facing the spindle. Machining and comparative measurement is carried out in a similar manner to that described above.

Alternatively, if there is no indexable core or tombstone, the artifact 26 may be located elsewhere on the bed 2 of the machine tool while the workpiece 14 is being machined and inspected. A manipulator (not shown) on the spindle 6 of the machine tool then picks up and removes the newly-machined workpiece, picks up the artifact from its location on the bed 2, and places it in the position just vacated by the workpiece. The measurement cycle on the artifact then proceeds, in the same manner as described above. Another possibility is to locate the artifact on a pivotable arm on the bed 2 of the machine tool. This pivotable arm can swing the artifact into the measuring position (once the workpiece has been removed from that position) and can be swung out of the way during the machining and measuring cycles of the workpiece itself. Nevertheless, the arm still keeps the artifact in the same thermal environment as the workpiece.

It will be appreciated that it is desirable to keep the time delay between the inspection of the workpiece and the inspection of the artifact to a minimum. This ensures that no significant thermal changes can take place between the two measurements. It is desirable that the artifact should be re-measured for each workpiece which is inspected, for the same reasons, and this is in distinction to some artifact comparison techniques where the artifact is measured only once or only at infrequent intervals. Normally, the artifact will be inspected after the workpiece, though it could be inspected before.

Figure 3:
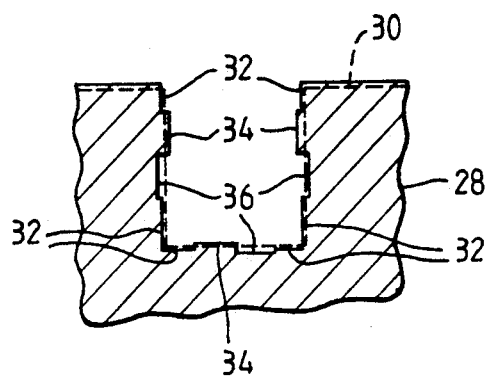
FIG. 3 is a section of part of a first artifact.

FIG. 3 is a cross-sectional view of part of a modified artifact 28, the features of which are shown in solid lines. Superimposed in the drawing and shown by broken lines 30 is the position of surfaces of the workpiece 14 which is to be inspected. The superimposition of the lines on the drawing shows the corresponding positions of the workpiece and the artifact when indexed to the operative position on the machine tool at which they can be addressed by the probe 20. It will be seen that the broken lines 30 do not correspond exactly with the outline of the artifact, because of machining inaccuracies. The task is to determine the magnitude of the machining inaccuracies, e.g. whether they are so great that the workpiece should be deemed out of tolerance.

The artifact 28 has regions 32 which are machined to the nominal dimensions required of the workpiece, and pre-calibrated to traceable standards. Additionally, it has regions 34,36 which are raised regions and lowered regions respectively when compared with the regions 32. These thus form steps in the surface of the artifact. The height of the steps is small, and has been exaggerated in FIG. 3 for purposes of illustration. The height of the steps is also accurately known and pre-calibrated. They correspond approximately to the limits of the tolerance permitted for the workpiece, in positive and negative directions compared with the nominal size.

The artifact of FIG. 3 is used as follows. For each point on the workpiece 28 which is to be measured, the corresponding three regions 32,34,36 are measured on the artifact, using the probe 20 and with the artifact nominally in the same position as the workpiece. The reading obtained for the region 32 is compared with that obtained on the workpiece, as previously. However, of course, it is unlikely that the workpiece coordinate reading will be identical with that on the artifact, because of machining inaccuracies. As pointed out above, inaccuracies of the machine's scales caused by thermal distortion of the machine's structural components still have a slight effect in such a situation. The readings taken on the raised and lowered step regions 34,36 are used to overcome this. The step height between these two regions is accurately known, since the artifact is pre-calibrated. The step height as determined using the machine's scales is calculated from the coordinate readings taken on these two regions. The result is unlikely to be completely accurate, but the computer numerical control of the machine is programmed to use the accurate and inaccurate values to calculate a scaling factor between the two. This enables the coordinate reading of the region 32 as indicated by the machine's scales to be compensated. Because an individual scaling factor is determined over the very small range of the machine's scale which is actually being used for the measurement concerned, this ensures that the thermal inaccuracies of the scale can be accurately compensated, even if the scale is subject to different thermal inaccuracies in different parts of its measuring range.

The same procedure is repeated at each of the other points of the workpiece to be measured, and the thus-compensated workpiece measurements are compared with the artifact measurements for each point.

Normally, the artifact will be manufactured out of the same material as the workpiece, so as to undergo the same thermal expansion. If the material is soft, the artifact could be provided with a harder coating to make it more durable, e.g. by anodising in the case of an aluminium workpiece. Alternatively, the artifact could be made of a different material which has the same coefficient of thermal expansion as the workpiece material. As another alternative, the artifact can be made of a material with a different coefficient of thermal expansion, but in this case it is necessary to know the coefficients of expansion of the materials of both the artifact and the workpiece, and to provide an appropriate temperature probe to take the temperature at the time of the measurements. This data is supplied to the computer numerical control so that an appropriate correction factor can be applied to the measured dimensions of the artifact and workpiece.

In place of artifacts of the same nominal size and shape as the workpiece to be inspected, it is possible to use a universal artifact which can be used for numerous different workpieces. One example is shown at 38 in FIG. 4. It is in the form of a cone, having stepped instead of sloping sides. The steps are accurately pre-calibrated, in both horizontal and vertical directions, to a traceable standard. The volume of the artifact 38 generally encompasses the envelope 30 of the workpiece to be inspected. In the same manner as the previous embodiments, the artifact is kept in the same thermal environment as the workpiece during machining and inspection of the workpiece, and it is indexed or transferred into the same position occupied by the workpiece when it is to be measured. Although no point on the artifact corresponds exactly with one on the workpiece, nevertheless the thermally induced inaccuracies of the machine's scales can be compensated in the same manner as described above with reference to FIG. 3. For example, when measuring the coordinates of a point 42 on the workpiece 30, in a horizontal direction, points 44 and 45 on the artifact 38 are measured so as to determine the step height 40 (in the horizontal direction) in the region of the point 42. Comparing the step height 40 as thus measured using the machine's scales with the known pre-calibrated value indicates a scaling factor for the local thermally induced inaccuracy of the scales in the region of the point 42 on the workpiece, and the measurement of that point on the workpiece can be compensated accordingly by the machine's control. Similar compensation is carried out for all other points on the workpiece to be measured.

Alternatively or additionally, instead of using the points 44,45, if it is desired to measure (say) the diameter of the workpiece 30 between the points 42 and 46, the following procedure may be used. The points 42 and 46 on the workpiece are probed in the usual way. The diameter of the workpiece is initially calculated by subtracting the coordinates of the point 42, as measured, from those of the point 46. Subsequently, during the measurement cycle of the artifact, points 44,47 in the same general vicinity as the points 42,46 are probed. The measured diameter of the artifact 38 between the points 44,47 is calculated by subtraction in the same way. This measured value is compared with the known, pre-calibrated value of this diameter of the artifact, to obtain a compensation factor. Finally, this compensation factor is applied to the previously measured diameter of the workpiece between the points 42,46 to obtain a more accurate value. By selecting points 44,47 on the artifact covering a similarly-positioned range of the machine's scales as is used for the measurement between points 42 and 46, the thermal inaccuracies of the scale within that range can be accurately compensated, even though the thermal inaccuracies may vary from one part of the scale to another.

FIGS. 5 and 6 show another design of artifact 48, which is pre-calibrated and used in a very similar manner to that of the artifact 38. In plan view the artifact 48 is cruciform, having arms 49. Each arm comprises steps 50, used in the same manner (vertically or horizontally) as the steps in the artifact 38 of FIG. 4.

The methods discussed so far have compensated for thermal expansion of the workpiece itself, and for linear errors in the machine's scales caused by thermal expansion of structural components of the machine. However, other errors can be caused by thermal distortion of the machine's structural components, including squareness errors where the thermal growth of the structural components is such that the X,Y,Z axes of the machine cease to be truly perpendicular to each other. The artifacts of FIGS. 5 and 6 could be used to detect this, by measuring the sides of the arms 49 at various points, using the machine scales and the probe 20, and calculating whether the values thus measured show the arms to be perpendicular. Given that the perpendicularity of the arms has been accurately pre-calibrated, it follows that any departure from the calibrated perpendicularity in the measured values can be attributed to errors of machine alignment. Measurements on workpieces can be compensated accordingly.

The invention can also be used to detect interpolation and other errors in a workpiece which has been machined to a desired contour by commanding the cutting tool to follow the required path, using interpolation techniques between given points on the path. The workpiece is compared with an artifact which has the same nominal contour, and which has been accurately calibrated. The artifact could, if desired, have been manufactured in the same manner on the same machine tool as the workpiece, and thus be subject to similar interpolation, squareness, linear and other errors, provided the calibration has been carried out independently of the machine. If the artifact was manufactured at the same position within the working volume of the machine, its calibration gives information about the interpolation accuracy and other errors of the machine at that position. This information is stored in the machine control, in the form of a table of calibration values for each point of interest on the artifact surface. When the workpiece and the artifact are subsequently compared, by probing both the workpiece and the artifact at the same location on the machine tool, a value is obtained for each point of interest, representing the difference between the point on the workpiece and on the artifact. The corresponding calibration value from the table is added to this difference value, taking account of their signs, to obtain the error in the workpiece.

If desired, it is possible to produce from measurements on the artifact an error map of all the errors (linear, squareness, interpolation). This error map may be stored in the machine control or in an external computer, in the form of a table of correction values, and is used compensate the readings which have been taken on the workpiece. The error map is specific to the particular region of the working volume of the machine tool where the workpiece is located, since the artifact was also located in that same region. The artifact was also subject to the same thermal environment as the workpiece. The result is that the workpiece measurements can be very accurately compensated for the various thermal effects.

FIGS. 7 and 8 show a further form of universal artifact 52. It takes the form of an open square frame, consisting of four side members 54 with an opening in the middle. Four pillars 56 are provided upstanding from each corner of the square. Each pillar has a central bore 58. The centres of the bores 58 are pre-calibrated and lie at the four corners of an accurate square. This artifact 52 is kept in the same thermal environment, and may be transferred or indexed in and out of the region occupied by a workpiece (the envelope of which is shown by broken lines at 30A), in the same way as in the previous embodiments. The stylus 22 of the probe 20 can be inserted in each bore 58 and with three or four probing moves the coordinates of the centre of the bore can be determined. By comparing the dimensions of the accurately known square with the coordinates obtained from these measurements on the artifact, compensation factors are readily calculated by the computer numerical control both for linear errors in the region of the artifact (and hence in the region of the workpiece) and also for squareness errors in that region.

Alternatively, if the envelope of the workpiece is as indicated at 30B, lying entirely within the square open frame provided by the members 54, and if the machining operations are such that access to the workpiece is not impeded by the artifact, then the artifact can be fixed permanently in position surrounding the workpiece. This saves time, since it is not necessary to transfer the artifact into position after removing the workpiece. Instead, both the workpiece and the artifact can be measured as part of the same measuring cycle.

If desired, steps may be provided on the members 54 or pillars 56 of the artifact 52, and used in the same manner as the steps in the embodiments of FIGS. 3-6. The bores 58 may be dispensed with, if desired, and measurements simply made on the exterior surfaces of the pillars 56.

FIG. 9 shows another embodiment. In place of an artifact 52 having bores 58, bores 60 may be machined in the bed 2 of the machine tool, e.g. by drilling and reaming. The bores 60 are provided at regular intervals over the entire area where a workpiece is likely to be situated. The spacings of the bores 60, and the squareness of their locations, are pre-calibrated accurately to a traceable standard. Appropriately selected bores 60 may be used in exactly the same way as the bores 58. For example, in the case of a workpiece occupying the envelope 30C, four bores 60A adjacent its corners may be selected. These bores 60A are probed in the same measurement cycle as the inspection of the workpiece, and compensation factors determined as previously.

In place of the accurately machined bores 60 in the bed 2 of the machine tool, it is possible to use the slots already provided on the beds of many machine tools, intended for mounting workpieces, fixtures etc. Of course, the accuracy of the machining of these features cannot be relied upon. Nevertheless, they can be accurately measured and calibrated to a traceable standard using some measurement device other than the machine's scales. A map is then stored in the computer numerical control, giving the accurately-determined dimensions of each of the slots. During subsequent inspection of workpieces, a series of steps are included in the measurement cycle to measure the nearest features of these slots to the workpiece. The values obtained from these measurements of slot features are compared with the accurate values known from the pre-calibration, to derive compensation factors in the same manner as above.

Alternatively, instead of boring holes 60 in the bed 2 of the machine, the holes 60 could be provided in a plate-like artifact which is secured to the bed 2, with the workpiece then being secured on this plate-like artifact. This artifact is desirably made of the same material as the workpiece. If a different material is used, then the above-described technique of measuring the temperature of the artifact and/or of the workpiece and calculating a compensation factor using the different thermal coefficients should be used.

There is an advantage in having an artifact which lies within the envelope 30 of the workpiece, or which has at least some points lying within that envelope. This enables compensation to be carried out of those regions of the machine's scale which are used when measuring internal features of the workpiece.

FIG. 10 shows a composite artifact 68, which is used in place of one of the cassettes 10. To this end, it has a mounting portion 70 having a longitudinally extending dovetail section by which it is mounted in the core 4 and in the carousel 15. In the upper portion of the artifact, there are formed a plurality of artifact units 72 (five in the present example). Each unit 72 is provided with various measurement features. These include a boss 74 on the top surface of the unit, within which is provided a stopped, concentric bore 76. On one side of each unit, there is an annular recess 78, within which there is a concentric boss 80. Within the boss 80, there is a concentric bore 82 which passes through to the opposite side of the unit 72, where a similar annular recess 78 and boss 80 are provided.

The position of each of the units 72 in the artifact 68 corresponds to the position of a workpiece 14 in a cassette 10. Thus, when the core 4 is indexed, one of the units 72 is brought into the same position in space within the working volume of the machine tool as was occupied by one of the workpieces, enabling comparative measurement to be made as described above. It will be seen that measurement features 74-82 are provided in each of three separate faces of the unit 72, corresponding to three faces which are most easily accessible for machining in the corresponding workpiece. These features are therefore located in corresponding positions to those features of the workpiece upon which comparative measurements are likely to be needed. Measurements which may be taken upon the unit 72 include the length, breadth and height of the unit itself, and the diameters of the various bosses and bores.

Between the dovetail-section mounting portion 70 and the artifact units 72, an L-shaped slot 84 is provided. This slot is machined right through the thickness of the material of the artifact 68, so that the only connection between the mounting portion 70 and the rest of the artifact is via webs of material 86,88 at each end of the slot. The purpose of this slot is to provide isolation between the mounting portion 70 and the rest of the artifact. Should the mounting portion 70 be subjected to distortion as a result of clamping pressures, these distortions are not transmitted to the rest of the artifact but instead are accommodated by flexing of a vertical web 90 at one end of the L-shaped slot. Conversely, if the temperature changes, the bulk of the artifact including the unit 72 can undergo thermal expansion or contraction (in the same manner as a workpiece) without hinderance from clamping pressures in the mounting portion 70.

The artifact 68 can if desired be made on the same machine tool upon which it is subsequently to be used for measurement purposes, though this is not essential. If it is made of aluminium or aluminium alloy, it is desirably polished chemically after machining, and anodised to provide a durable surface. All the various features of the units 72 which are subsequently to be used for comparative measurements are then calibrated, to determine their precise dimensions to traceable standards for use as described above.

It has been discussed above that a plurality of individual artifacts may be mounted in one of the cassettes 10, in the same manner as workpieces. Such individual artifacts may be universal artifacts as described, or dedicated artifacts (replicas of the nominal size and shape of the workpiece to be inspected). It is possible to produce a composite artifact similar to that shown in FIG. 10, but having individual artifact units integrally formed therein which are replicas of the workpieces to be inspected, instead of the universal artifact units 72. Such dedicated artifact units can be produced on the same machine tool as is used for manufacturing the workpieces. This may be done by machining a blank artifact 68 using the same numerically controlled machining steps which will subsequently be used for the manufacture of workpieces in one of the cassettes 10. As with the artifact of FIG. 10, such an artifact having a plurality of dedicated artifact units is then removed from the machine tool, polished and anodised if desired, and the various features of the dedicated artifact units are measured and calibrated to a traceable standard.

FIG. 11 shows another composite artifact 98 having a plurality of artifact units 72 upon which comparative measurements may be made. In similar manner to the artifact of FIG. 10, the unit 72 may be universal artifact units (as shown) or they may be replicas of the workpieces to be inspected, forming dedicated artifact units. As previously, the positions of the units 72 correspond to the positions of workpieces in a cassette 10, so that they may be indexed into the same locations in space as the workpieces.

The artifact of FIG. 11 has a separate mounting portion 100, which is elongate and of trapezoidal cross-section, corresponding to the dovetail mounting portion 70 in FIG. 10, for mounting the artifact in the core 4 and in the carousel 15. In place of the isolating slot 84, the artifact 98 is mounted kinematically to the mounting portion 100. This is achieved by means of three balls 102 which are bonded to the lower surface of the artifact 98, e.g. in suitable recesses (not shown). The balls 102 locate in corresponding vee-groove recesses 104 in the upper surface of the mounting portion 100, urged into contact by tension springs 106 between the artifact 98 and the mounting portion 100. The arrangement of the vee-groove recesses 104 is such as to constrain all the degrees of freedom of the movement of the artifact 98 relative to the mounting portion 100, when the balls 102 are held in contact with the recesses 104. However, thermal expansion and contraction of the artifact 98 is permitted without hinderance from clamping pressures in the mounting portion 100, simply by sliding of one or more of the balls 102 along its corresponding recess 104. In a similar manner, clamping pressures in the mounting portion 100 are not transmitted to the artifact unit 98. In fact, the isolation thus achieved between the artifact 98 and the mounting portion 100 is better than that provided by the slot 84 of FIG. 10, since there is greater freedom for both lateral and longitudinal expansion and contraction of the artifact 98 and mounting portion 100 relative to each other.

If desired, instead of the balls 102 it is possible to provide hemispherical projections machined integrally on the lower surface of the artifact, which engage in the recesses 104 in exactly the same way. Alternatively, the recesses 104 can be provided in the lower surface of the artifact 98, and the balls 102 or hemispherical projections can be in the upper surface of the mounting portion 100. It is also possible to provide other forms of kinematic mounting, such as three balls 102 which engage respectively with a flat surface, a vee-groove recess and with a trihedral recess having three points of contact with the corresponding ball. In a slightly less preferred form of this construction, the trihedral recess may be replaced by a conical recess.

FIGS. 12 and 13 show another way in which isolation may be achieved between a composite artifact 110 and a separate mounting portion 112, by means of a kinematic mount. The artifact 110 and mounting portion 112 are generally similar to those of FIG. 11, and the artifact includes universal or dedicated artifact units 72 as previously. The mounting between the artifact 110 and the mounting portion 112 is achieved by six wires or thin rods 114-119 extending between respective lugs 120 on the artifact and 122 on the mounting portion. Each wire or rod 114-119 is stiff in tension and compression, but has two thinner neck portions 124, one adjacent each end, which allow it to flex laterally. Three wires or rods 114,115,116 are arranged vertically, two at one end of the artifact and one at the other end. Two wires or rods 117,118 are arranged horizontally and laterally of the artifact, one at each end. The sixth wire or rod 119 is arranged horizontally and longitudinally of the artifact. Because each of the wires or rods is stiff in tension and compression, this arrangement provides constraint of the six possible degrees of freedom between the artifact 110 and the mounting portion 112. At the same time, however, expansion and contraction of the artifact 110 can take place in any direction without hinderance from the clamped mounting portion 112, being accommodated by flexure at the neck portions 124. Likewise, such flexure also accommodates any clamping distortions in the mounting portion 112, so that they are not transmitted to the artifact 110.

Any of the artifacts described above may be made from a material with a low thermal inertia. This is useful where the workpiece has been deluged with coolant during the machining cycle, and is therefore at or close to the temperature of the coolant. Just before measuring the artifact, it too is deluged with coolant. The use of a material of low thermal inertia means that the artifact will quickly reach the same temperature as the coolant, so that the time taken for this coolant deluge step is reduced.

Reference has been made to the calibration of the various artifacts described. This can be done by any convenient inspection technique capable of the required accuracy, preferably to a traceable standard. The most convenient technique is to measure the artifact on a three-dimensional coordinate measuring machine.

I claim:

1. A method of measuring on a machine tool, the machine tool comprising two parts which are movable relative to each other, the method comprising:

providing an artifact having a known dimension on a first one of said parts, providing a probe for sensing surfaces of said artifact on the other of said parts, measuring said known dimension of said artifact using the probe, to produce a measurement value, said measuring step taking place as part of a cycle for machining one or more workpieces on said first one of said parts of the machine tool, and comparing said measurement value with at least one of said known dimension and a measured dimension of said workpiece, wherein said artifact is located on said first one of said parts of the machine tool when not being measured, in such a manner as to experience temperature changes similar to those experienced by said workpiece also located on said first one of said parts of the machine tool.

2. A method according to claim 1, in which the machine tool has means for measuring the displacement between the two parts, the method further comprising:

locating a workpiece at a given position on said first part of the machine tool, measuring a dimension of the workpiece at said position, using the measuring means of the machine tool and said probe, to produce a workpiece measurement value, locating said artifact on said first part in substantially the same position as said position of the workpiece, performing said step of measuring the known dimension of the artifact at said position, using the measuring means of the machine tool and said probe, to produce an artifact measurement value, and comparing the workpiece measurement value with the artifact measurement value, or compensating the workpiece measurement value with a value derived from the artifact measurement value.

3. A method according to claim 2, wherein the artifact is a replica of said workpiece.

4. A method according to claim 1, wherein the artifact is a universal artifact having a plurality of features with known dimensions.

5. A method according to claim 1, wherein the artifact comprises a measurement portion having one or more features to be measured; a mounting portion adapted to be mounted in the machine tool; and isolation means between the measurement portion and the mounting portion for at least partially isolating the measurement portion from distortion of the mounting portion.

6. A method according to claim 1, wherein the artifact comprises a mounting portion adapted to be mounted in a machine tool; and a plurality of artifact units provided on the mounting portion in spaced relationship to each other, each artifact unit comprising a measurement portion having one or more features to be measured.

7. A method of measuring a workpiece on a machine tool, the machine tool comprising two parts which are movable relative to each other, and means for measuring the displacement between the two parts, the method comprising:

locating the workpiece at a given position on a first one of said parts of the machine tool, measuring a dimension of the workpiece at said position, using the measuring means of the machine tool and a probe mounted on the other one of said parts, to produce a workpiece measurement value, locating an artifact on said first part in substantially the same position as said position of the workpiece, the artifact having a known dimension, measuring the known dimension of the artifact at said position, using the measuring means of the machine tool and a probe mounted on the other one of said parts, to produce an artifact measurement value, and at least one of comparing the workpiece measurement value with the artifact measurement value and compensating the workpiece measurement value with a value derived from the artifact measurement value.

8. A method according to claim 7, wherein the artifact is a universal artifact having a plurality of features with known dimensions.

9. A method according to claim 7, wherein the artifact is a replica of said workpiece.

10. A method according to claim 7, wherein the artifact comprises a measurement portion having one or more features to be measured; a mounting portion adapted to be mounted in the machine tool; and isolation means between the measurement portion and the mounting portion for at least partially isolating the measurement portion from distortion of the mounting portion.

11. A method according to claim 7, wherein the artifact comprises a mounting portion adapted to be mounted in a machine tool; and a plurality of artifact units provided on the mounting portion in spaced relationship to each other, each artifact unit comprising a measurement portion having one or more features to be measured.

12. A method according to claim 7, wherein a plurality of workpieces are located and measured at a plurality of respective given positions, and a corresponding plurality of artifacts or artifact units are respectively located measured at substantially the same positions.

13. An artifact for measurement on a machine tool, comprising a measurement portion having one or more features to be measured; a mounting portion mounted by clamping onto the machine tool; and isolation means between the measurement portion and the mounting portion for at least partially isolating the measurement portion from distortion caused by at least one of clamping of the mounting portion and thermal expansion and contraction when the mounting portion is clamped.

14. An artifact according to claim 13, wherein the mounting portion and the measurement portion of the artifact are separated by a slot, webs of material connecting the mounting portion and the measurement portion define ends of the slot, the slot and the webs of material being the isolation means between the mounting portion and the measurement portion.

15. An artifact according to claim 13 wherein the isolation means comprises a kinematic mount between the mounting portion and the measurement portion.

16. An artifact according to claim 13, wherein said isolation means comprises a plurality of rods or wires extending between the measurement portion and the mounting portion, the rods or wires being stiff in tension and compression but capable of flexure.

17. An artifact for measurement on a machine tool, comprising a mounting portion adapted to be mounted in a machine tool; and a plurality of artifact units provided on the mounting portion in spaced relationship to each other, each artifact unit comprising a measurement portion having one or more features to be measured, wherein each of the plurality of artifact units is positioned, when mounted in the machine tool, to be movable to a position of a corresponding one of a plurality of workpieces also mounted in the machine tool.

* * * * *